US008862309B2

(12) United States Patent
Wehmeier et al.

(10) Patent No.: US 8,862,309 B2
(45) Date of Patent: Oct. 14, 2014

(54) METHOD FOR DIAGNOSING AND/OR ADAPTING AT LEAST ONE SYSTEM OF A DEVICE

(75) Inventors: Kersten Wehmeier, Ludwigsburg (DE); Matthias Kuentzle, Schwieberdingen (DE); Andreas Koring, Reutlingen (DE); Martin Sternke, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 452 days.

(21) Appl. No.: 13/173,716

(22) Filed: Jun. 30, 2011

(65) Prior Publication Data
US 2012/0089296 A1    Apr. 12, 2012

(30) Foreign Application Priority Data

Jul. 2, 2010    (DE) .......................... 10 2010 030 868

(51) Int. Cl.
| *F01N 11/00* | (2006.01) |
| *B60W 50/02* | (2012.01) |
| *F02D 41/26* | (2006.01) |
| *F02D 41/22* | (2006.01) |
| *F02D 41/14* | (2006.01) |
| *F02D 41/00* | (2006.01) |
| *F02D 41/18* | (2006.01) |

(52) U.S. Cl.
CPC ........ *B60W 50/0205* (2013.01); *F02D 41/1446* (2013.01); *B60W 2510/0619* (2013.01); *F02D 2200/0404* (2013.01); *F02D 41/1452* (2013.01); *F02D 41/0055* (2013.01); *B60W 2510/0633* (2013.01); *F02D 2200/0602* (2013.01); *F01N 2900/1624* (2013.01); *F01N 2900/1602* (2013.01); *B60W 2510/0671* (2013.01); *B60W 2510/0628* (2013.01); *F02D 41/263* (2013.01); *F02D 2200/0802* (2013.01); *F02D 2200/0814* (2013.01); *B60W 2510/0614* (2013.01); *F02D 2041/147* (2013.01); *F01N 2900/18* (2013.01); *F02D 2200/0406* (2013.01); *F02D 2200/0618* (2013.01); *F02D 41/1454* (2013.01); *F02D 41/18* (2013.01); *F01N 2900/1404* (2013.01); *B60W 2510/0604* (2013.01); *F02D 41/1445* (2013.01); *B60W 2530/12* (2013.01); *F01N 2900/1402* (2013.01); *F01N 11/00* (2013.01); *F02D 41/22* (2013.01); *F01N 2900/0416* (2013.01)
USPC .......................... 701/29.1; 701/30.5; 701/101

(58) Field of Classification Search
USPC ............. 701/29.1, 29.4, 29.7, 30.5, 100, 101, 701/103, 108, 109
See application file for complete search history.

(56) References Cited

U.S. PATENT DOCUMENTS

| 4,425,614 | A  | * | 1/1984  | Barron et al. .................... 700/38 |
| 6,904,355 | B2 | * | 6/2005  | Yasui et al. .................... 701/108 |
| 2004/0030484 | A1 | * | 2/2004  | Yasui et al. .................... 701/108 |
| 2009/0198474 | A1 | * | 8/2009  | Fritz et al. ..................... 702/183 |
| 2009/0322264 | A1 | * | 12/2009 | Imura ...................... 318/400.09 |

* cited by examiner

*Primary Examiner* — Richard Camby
(74) *Attorney, Agent, or Firm* — Michael Best & Friedrich LLP

(57) ABSTRACT

A method for diagnosing and/or adapting at least one system (12, 14) of a device (10) is described, which method comprises the following steps:
(a) at least one manipulated variable (44) of at least one system (12, 14) of the device (10) is changed with respect to a currently present value of the manipulated variable (44);
(b) at least two state variables (46) of at least one system (12, 14) are determined;
(c) a decision (61) about the further execution of the method is made as a function of the at least two state variables (46).

29 Claims, 2 Drawing Sheets

METHOD FOR DIAGNOSING AND/OR ADAPTING AT LEAST ONE SYSTEM OF A DEVICE

BACKGROUND OF THE INVENTION

The invention relates to a method for diagnosing and/or adapting at least one system (12, 14) of a device (10), as well as to an open-loop and/or closed-loop control device, a computer program and a storage medium for use in performing the method.

In the course of the technical development of motor vehicles, the number and the scope of what are referred to as OBD (On-Board Diagnostics) have increased. In particular, the proportion of such diagnostic devices which require active intervention into a system which is to be respectively tested has risen. Furthermore, the need to ensure that diagnoses performed on systems are not influenced by interactions with other systems also increased. This results, inter alia, in that diagnostic operations can run in parallel only to a limited degree. In particular, in the case of diagnostic operations in an exhaust gas cycle which is relevant for emissions it may be significant to identify the exhaust system clearly as being in accordance with regulations or as not being in accordance with regulations. The difficulty arises from this that such diagnostics have not been adapted to the increased number of individual diagnostics. One possibility is to predefine what are referred to as switch-on conditions in order to improve the diagnostics performed on systems in motor vehicles. In practice, compromises are often made for this purpose, as a result of which the quality of a diagnostic operation or a setting of operational variables can be impaired.

SUMMARY OF THE INVENTION

The problem on which the invention is based is solved by a method wherein (a) changing at least one manipulated variable (44) of at least one system (12, 14) of the device (10) with respect to a currently present value of the manipulated variable (44); (b) determining at least two state variables (46) of at least one system (12, 14); (c) making a decision (61) about the further execution of the method as a function of the at least two state variables (46); and by an open-loop and/or closed-loop control device, a computer program and a storage medium for performing the method.

The invention is based on the idea that systems of a technical device, in particular of a motor vehicle, are very extensive and can influence one another in terms of their effects. For this reason, a particularly structured and flexibly operating method is proposed which comprises, in particular, the following steps:

a) at least one manipulated variable of at least one system of the device is changed with respect to a currently present value of the manipulated variable. In this context, a manipulated variable is understood to be an input variable and/or any internal variable or other variable of the respective system insofar as this variable can be changed in a selective fashion. Furthermore, properties of manually exchangeable components—for example an injection valve—may be manipulated variables within the sense of the method.

b) at least two state variables of at least one system are determined. State variable is understood to be an input variable, an output variable and/or any internal variable or other variable of the respective system insofar as this variable can be determined. State variables can therefore provide information about the state and/or the behavior of a system or about the totality of all the systems. The manipulated variables described above can also at the same time have the significance of state variables.

c) a decision about the further execution of the method is made as a function of the at least two state variables.

It is therefore possible to selectively excite, that is to say to stimulate, an individual system or a plurality of systems of the device. It may be sufficient for this to change one manipulated variable or even any desired number of manipulated variables in one or more systems with respect to a currently present value of the manipulated variable or variables. In this context, known interactions between the systems of the device can also be taken into account. The reaction of the system or of the plurality of systems to the changing of one or more manipulated variables signifies a system response of the individual system or of the totality of all the systems. This system response can be correspondingly complex. The system response results from determination of at least two state variables of at least one system. In a minimum case, it may be sufficient to determine an input variable and an output variable in the same system or in a different system.

It goes without saying that the method according to the invention can also be used in a flexible way insofar as it can be carried out, for example, within the scope of what is referred to as OBD (On-Board Diagnostics) by means of an open-loop and/or closed-loop control device which is present in the vehicle, but can likewise be carried out by means of a test rig or a test device which is coupled only temporarily to the vehicle.

One advantage of the invention is that systems of a technical device, in particular of a motor vehicle, can be tested, set, adapted and/or developed with an optimized diagnostic method, wherein legal requirements can also be satisfied more easily or more simply. In particular, the amount of time expended on diagnostics can be shortened and/or more precise results can be achieved.

In particular, the method provides that in step (c) the further execution of the method comprises at least one of the following measures:

refined and/or repeated diagnosis of a system or of a system component which is contained therein and which is supposed to be faulty;

changing of a diagnostic algorithm as a function of the at least two state variables which are determined;

selection of alternative diagnostic algorithms from a stored supply as a function of the at least two state variables which are determined;

changing of the sequence of individual diagnostic steps of a diagnostic algorithm;

changing of the sequence in which the systems and/or system components are checked; and/or unchanged continuation of the diagnostic method.

As a result, the further sequence of the diagnostic method can advantageously be adapted to respectively determined values of the state variables and the diagnostics can be continued in a flexible way. In particular, a system or a system component which is contained therein and which is supposed to be faulty can be examined in a particularly precise fashion. For example, the diagnosis of the respective system can be repeated.

Furthermore, the diagnostic algorithm can be changed. For this purpose, it is also conceivable to allow the diagnosis to run more slowly so that variables or values can be set more precisely to a final value. Furthermore, it is conceivable to form mean values over the state variables obtained over a plurality of repeated partial diagnoses. Likewise, the algorithm which is a basis for one diagnosis or a partial diagnosis can be changed in a flexible way as a function of the state variables which are determined.

Furthermore, a diagnosis or partial diagnosis can be changed in such a way that it is carried out with an alternative algorithm. The alternative algorithm can be selected here as a function of the state variables which are determined, from a supply of available alternative diagnostic algorithms, which are stored, for example, in a memory of an open-loop and/or closed-loop control device.

It is also possible to change the sequence of individual diagnostic steps of a respective diagnostic algorithm. The measures which are described are aimed at adapting the diagnostic method in an optimum way as a function of the at least two evaluated state variables.

Furthermore, in order to classify more clearly a system or a system component which is suspected of being faulty, it is also possible to change a sequence in which the systems and/or system components are tested.

If, during a current diagnostic operation, all the systems are found to be satisfactory with a sufficient degree of reliability, the diagnostic method can also be continued without modification. This means that adaptation of the diagnostic algorithm is necessary only when at least one system or at least one system component was not able to be clearly found to be free of faults.

The method can be used in a particularly appropriate way if the device is a motor vehicle. Motor vehicles are particularly complex technical devices with a large number of different systems or system components. The method according to the invention can therefore be used particularly well for a diagnostic operation or adaptation or even the development of a motor vehicle.

In particular, the method can be applied advantageously if the systems which are to be tested or adapted comprise at least one air system, one injection system, one torque system and/or one exhaust system of the motor vehicle.

These systems are of particular significance for the performance capability of the internal combustion engine which is present in the motor vehicle, and for the exhaust system. In particular, these systems have a particularly large number of complex interactions. The method according to the invention can be applied particularly advantageously thereto.

In particular, when the method is applied for a motor vehicle there is provision that the state variables comprise at least one of the following variables:
  a sensor variable or a variable derived therefrom;
  an actuator variable or a variable derived therefrom;
  an offset value;
  a gain factor;
  a catalytic converter temperature; and/or
  an oxygen filling level of a catalytic converter.

The present variables are input variables, output variables, internal variables or other variables of systems of the motor vehicle. They can be particularly advantageously used as the state variables for the method according to the invention since they are generally easy to determine and are frequently already present in the open-loop and/or closed-loop control device. For example, these may be sensor variables or actuator variables. In particular, according to the invention further variables, such as for example a gradient, can be derived from the sensor variables and actuator variables. Likewise, offset values, that is to say for example values of variables which are changed in the course of an adaptation, a gain factor, for example in a control system of the motor vehicle, a catalytic converter temperature or an oxygen filling level can be defined as state variables. The oxygen filling level relates to the oxygen storage capacity (OSC) of a catalytic converter of the exhaust system.

Furthermore, there is provision that the manipulated variables for diagnosing the exhaust system comprise at least one of the following variables of an exhaust system:
  a lambda value of the exhaust gas;
  an oxygen mass flow rate;
  an exhaust gas mass flow rate;
  a variable of an exhaust gas recirculation system;
  an ignition angle;
  a proportion of oxygen, nitrogen, hydrogen, carbon monoxide and/or hydrocarbons in the exhaust gas;
  a metering rate of additives in the exhaust gas; and/or
  an exhaust gas temperature.

These manipulated variables influence, in particular, the system of the internal combustion engine and/or of the exhaust system of the motor vehicle. It goes without saying that these manipulated variables and further manipulated variables mentioned below can be used at the same time as state variables for the method according to the invention.

The exhaust gas recirculation system is characterized, for example, by the setting of an exhaust gas recirculation valve, from which an exhaust gas recirculation rate can also be determined in conjunction with other variables.

Furthermore, there is provision that the manipulated variables comprise at least one of the following variables of an air system:
  a fresh air mass flow rate;
  a variable of an exhaust gas recirculation system;
  a position of a throttle valve;
  a pressure;
  a pressure difference;
  a charging pressure; and/or
  a ratio of a quantity of fuel to a quantity of inert gas to an air quantity of a fuel mixture.

The air system of the motor vehicle can be changed in a selective fashion by means of one or more of these manipulated variables and can be used for diagnosing the air system as well as further systems which are dependent on the air system.

Furthermore there is provision that the manipulated variables comprise at least one of the following variables of an injection system:
  an opening time of an injector; and/or
  a fuel pressure.

Therefore, significant variables of the injection system which influence various systems of the motor vehicle, in particular the internal combustion engine and the exhaust system, are described. Furthermore, a type of injector of the injection system can also be a manipulated variable for the method. Although the type of injector cannot be changed during the diagnostic operation, its specific properties are involved in the behavior of the injection system and are therefore significant for the diagnostic operation.

Furthermore, the method according to the invention provides that an absolute value, a relative value and/or a gradient of the manipulated variables are/is changed. As a result, the manipulated variables can be stated in a specific way and likewise a time profile of the manipulated variable can be stated.

Likewise, it is possible according to the invention that an absolute value, a relative value and/or a gradient of the state variables are/is evaluated. As a result, the state variables can be evaluated specifically in terms of their state and/or their chronological behavior, and can contribute to a successful diagnosis of the motor vehicle.

Furthermore, the invention provides that the manipulated variables and/or the state variables are physical variables, numerical variables and/or variables which are determined by means of sensors. Physical variables are, in particular, mechanical and/or electrical variables which occur particularly frequently in systems of motor vehicles and correspondingly characterize the properties thereof. Likewise, numerical variables, which are present, for example, in the open-loop and/or closed-loop control device, can also be used as manipulated variables and/or state variables, specifically even if there is no direct relationship with a physical variable. Variables which are determined by means of sensors can be particularly easily determined, since sensors are already provided and configured in structural terms for a corresponding problem.

BRIEF DESCRIPTION OF THE DRAWINGS

Features which are important for the invention can also be found in the following drawings, in which the features may be important for the invention either in isolation or in different combinations, without having to make explicit reference thereto once more.

Exemplary embodiments of the invention are explained below with reference to the drawing, in which.

DETAILED DESCRIPTION

The same reference symbols are used for functionally equivalent elements and variables in all the figures, even in different embodiments.

Figure 1:
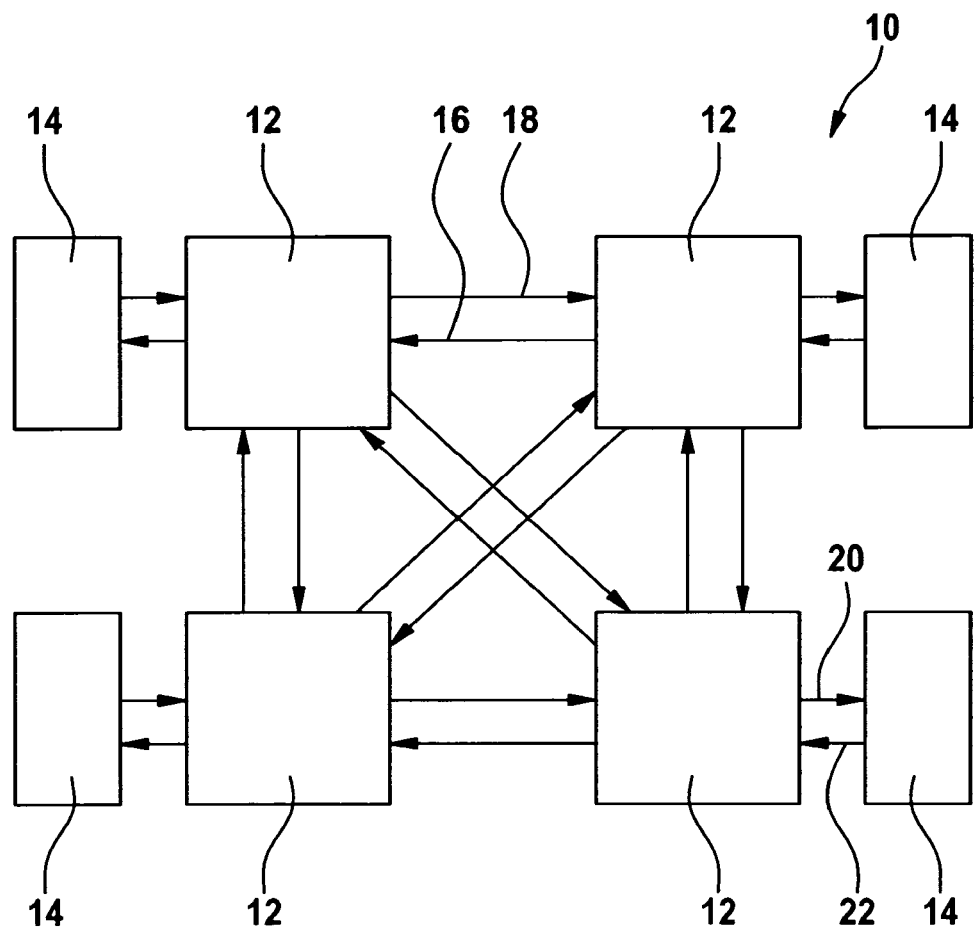
FIG. 1 shows a general and simplified illustration of systems of a device.
Figure 1:
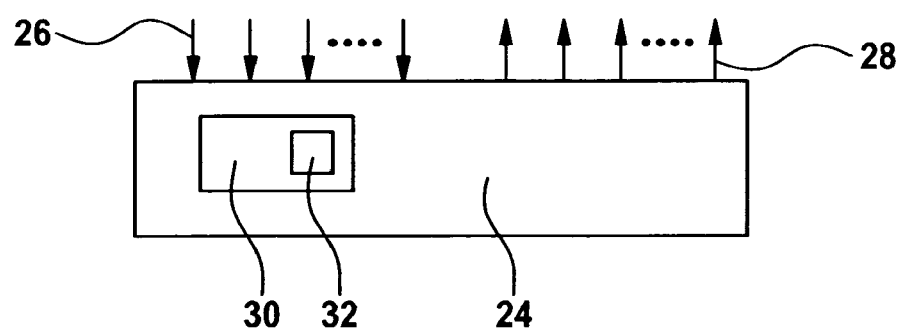

FIG. 1 shows a general and simplified illustration of a device 10, for example a motor vehicle, with, in this case, eight systems 12 and 14, four systems 12 of which have interactions 16 and 18 with one another, and four further systems 14 of which have interactions 20 and 22 with just one respectively assigned system 12.

An open-loop and/or closed-loop control device 24, which has here a number of input lines 26 and a number of output lines 28, is illustrated in the lower part of the drawing in FIG. 1. The input lines 26 and output lines 28 are represented symbolically and correspond to those for the systems 12 and 14 illustrated in the upper part of the drawing. However, these are not illustrated in detail in FIG. 1.

Furthermore, the open-loop and/or closed-loop control device 24 comprises a storage medium 30 and a computer program 32 which is stored on the storage medium 30. The computer program 32 is suitable, inter alia, for carrying out the method according to the invention.

FIG. 1 illustrates how systems, for example an air system, an injection system, a torque system and/or an exhaust system of a motor vehicle, can have a variety of indirect and/or direct relationships. These relate to the exchange of electrical signals as well as to coupling by other physical variables. For example, operational variables of the air system or of the injection system can influence the performance of the internal combustion engine and the current composition of the exhaust gas. Conversely, the composition of the exhaust gas can also act on the air supply and/or the injection system by means of control processes. It follows from this that a diagnostic operation or an adaptation of the device 10, for example for the purpose of reconciliation, adaptation or adjustment, and of the systems present therein, is frequently possible only by evaluating a plurality, or even a large number, of variables, preferably simultaneously or almost simultaneously.

Figure 2:
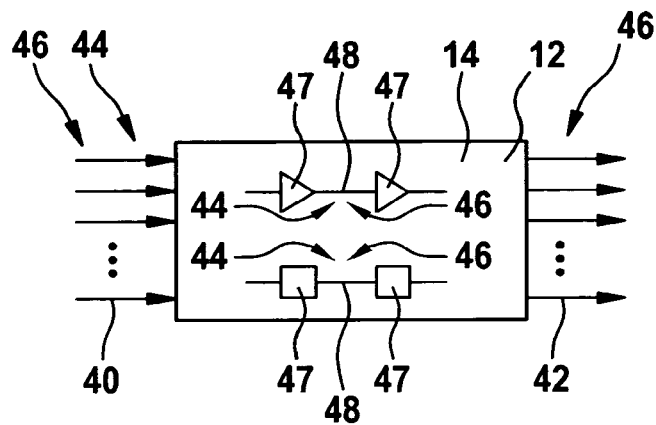
FIG. 2 shows an individual system with system components contained therein.

FIG. 2 shows by way of example a random system of the systems 12 or 14 illustrated in FIG. 1. The system in FIG. 2 has a number of input variables 40 in the left-hand region of the drawing, and a number of output variables 42 in the right-hand region. The input variables 40 can be output variables 42 of some other system 12 or 14, or else control signals of the open-loop and/or closed-loop control device 24 which are transmitted via the output lines 28. Insofar as the input variables 40 can be changed in a direct or indirect way via the open-loop and/or closed-loop control device 24, they can be used as manipulated variables 44 for the method according to the invention. The input variables 40 and, in particular, the output variables 42 can also be used as state variables 46 of the diagnostic method according to the invention.

Furthermore, four partial blocks or system components 47 are illustrated in the interior of the system 12 or 14. The system components 47 are characterized, inter alia, by internal variables 48. This is illustrated, by way of example, for a connection between two electrical switching elements in the upper region of the drawing, and likewise for the connection of two other elements of the system 12 and 14 in the lower region, respectively. If the internal variables 48 can be changed by means of the open-loop and/or closed-loop control device 24, they can also be used as manipulated variables 44 of the method according to the invention. If the internal variables 48 can be determined by means of the open-loop and/or closed-loop control device 24, they can also be used as state variables 46 for the diagnostic operation according to the invention.

Figure 3:
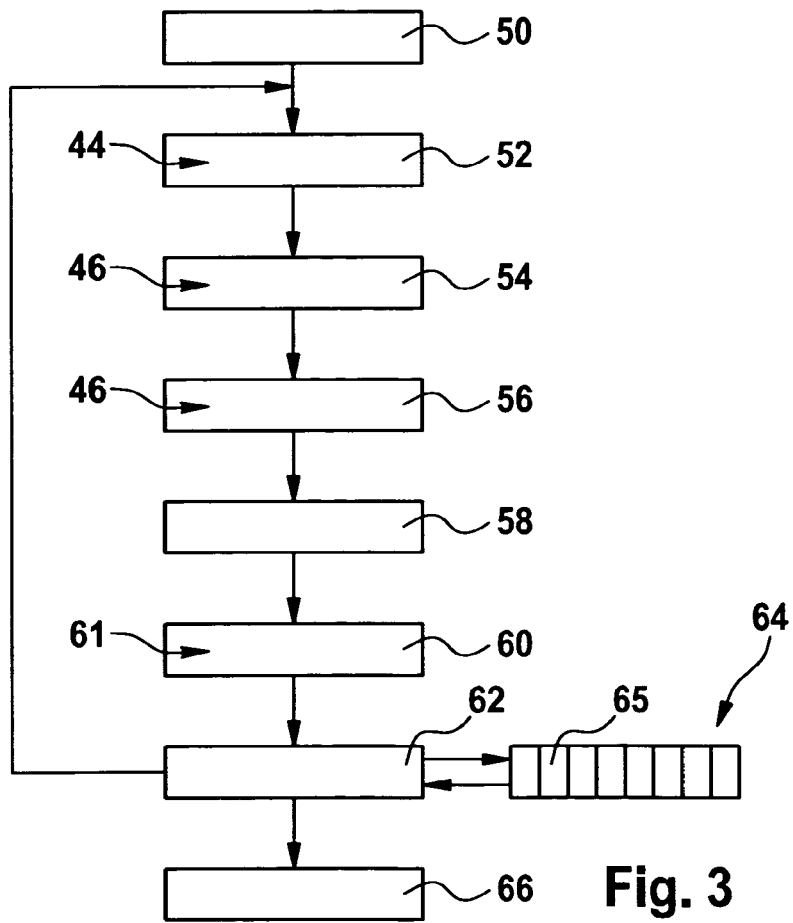
FIG. 3 shows a flowchart for carrying out the method.

FIG. 3 shows, by way of example, a flowchart of the method to be processed by the computer system 32 of the open-loop and/or closed-loop control device 24. The processing occurs essentially from top to bottom here. The diagnosis of the motor vehicle starts in a starting block 50. In a following block 52, a stimulus is generated. This means that at least one manipulated variable 44 is changed with respect to a current value of the manipulated variable 44 which is present. The at least one changed manipulated variable 44, which is generated in block 52, is input into one or more systems 12 and/or 14 of the motor vehicle in block 54.

In a following block 56, a system response which is characterized by an individual system 12 or 14 or a multiplicity of systems 12 and 14 or the entirety of all the systems 12 and 14 is determined. In a following block 58, features are formed therefrom, during which process, for example, a feature vector which represents the system response is formed. A following block 60 classifies the state variables 46 generated by the preceding blocks 54 and 56 and/or the system response and/or the feature vector. As a result, in block 60 a decision 61 can be made about the further execution of the method. The measure which is decided in block 60 is carried out in the following block 62. For example, a new, or at least partially changed, diagnostic algorithm 65 can be read by the block 62 from a supply 64 which is stored in the storage medium 30, and/or activated.

Furthermore, in block 62 it is possible to decide whether the procedure which is illustrated in FIG. 3 is ended in a subsequent final block 66, or whether the system branches back from block 62 to the input of block 52. After this, a new stimulus, that is to say, for example, a complex of changed manipulated variables 44, can be generated in block 52, and the method can be suitably continued as a function of the state variables 46 classified in the block 60.

It is apparent that the flowchart in FIG. 3 provides numerous advantageous possibilities for obtaining a corresponding system response after a stimulation of one or more systems 12 and/or 14, which system response comprises at least two state variables 46 which can be classified below on the basis of predetermined features and which permit very flexible use of the method.

Taking this as a basis, it is possible to decide about the further execution of the method, there being a plurality of measures possible, for example:
- refined and/or repeated diagnosis of a system 12, 14 or of a system component 47 which is contained therein and which is supposed to be faulty;
- changing of a diagnostic algorithm 65 as a function of the at least two state variables 46 which are evaluated;
- selection of alternative diagnostic algorithms 65 from a stored supply 64 as a function of the at least two state variables 46 which are evaluated;
- changing of the sequence of individual diagnostic steps of a diagnostic algorithm 65;
- changing of the sequence in which the systems 12, 14 and/or system components 47 are checked; and/or
- unchanged continuation of the diagnostic method.

The flowchart shown in FIG. 3 can be carried out, for example, within the scope of what is referred to as OBD (On-Board Diagnostics) by means of an open-loop and/or closed-loop control device 24 which is present in the vehicle. However, it is also possible to carry out the method according to the invention by means of a test rig or a test device which is only coupled temporarily to the vehicle.

The invention claimed is:

1. A method for diagnosing and/or adapting at least one system (12, 14) of a device (10), characterized in that said method comprises:
   (a) changing at least one manipulated variable (44) of a first system of the at least one system (12, 14) of the device (10) with respect to a currently present value of the manipulated variable (44);
   (b) determining at least two state variables (46) of a second system of the at least one system (12, 14) of the device (10); and
   (c) making a decision (61) about the further execution of the method as a function of the at least two state variables (46)
   characterized in that in step (c) the further execution of the method comprises at least one of the following measures:
      refined and/or repeated diagnosis of one of the systems (12, 14) or of a system component (47) which is contained therein and which is supposed to be faulty;
      changing of a diagnostic algorithm (65) as a function of the at least two state variables (46) which are determined;
      selection of alternative diagnostic algorithms (65) from a stored supply (64) as a function of the at least two state variables (46) which are determined;
      changing of the sequence of individual diagnostic steps of a diagnostic algorithm (65);
      changing of the sequence in which the systems (12, 14) and/or system components (47) are checked; and
      unchanged continuation of the diagnostic method.

2. The method according to claim 1, characterized in that the device (10) is a motor vehicle.

3. The method according to claim 1, characterized in that the systems (12, 14) which are to be tested or adapted comprise at least one of an air system, an injection system, an torque system and an exhaust system of the motor vehicle.

4. The method according to claim 1, characterized in that the state variables (46) comprise at least one of the following variables:
   a sensor variable or a variable derived therefrom;
   an actuator variable or a variable derived therefrom;
   an offset value;
   a gain factor;
   a catalytic converter temperature; and
   an oxygen filling level of a catalytic converter.

5. The method according to claim 1, characterized in that the manipulated variables (44) comprise at least one of the following variables of an exhaust system:
   a lambda value of the exhaust gas;
   an oxygen mass flow rate;
   an exhaust gas mass flow rate;
   a variable of an exhaust gas recirculation system;
   an ignition angle;
   a proportion of oxygen, nitrogen, hydrogen, carbon monoxide and/or hydrocarbons in the exhaust gas;
   a metering rate of additives in the exhaust gas; and
   an exhaust gas temperature.

6. The method according to claim 1, characterized in that the manipulated variables (44) comprise at least one of the following variables of an air system:
   a fresh air mass flow rate;
   a variable of an exhaust gas recirculation system;
   a position of a throttle valve;
   a pressure;
   a pressure difference;
   a charging pressure; and
   a ratio of a quantity of fuel to a quantity of inert gas to an air quantity of a fuel mixture.

7. The method according to claim 1, characterized in that the manipulated variables (44) comprise at least one of the following variables of an injection system:
   an opening time of an injector; and
   a fuel pressure.

8. The method according to claim 1, characterized in that one of an absolute value, a relative value and a gradient of the manipulated variables (44) is changed.

9. The method according to claim 1, characterized in that one of an absolute value, a relative value and/or a gradient of the state variables (46) is evaluated.

10. The method according to claim 1, characterized in that the manipulated variables (44) are one of physical variables, numerical variables and/or variables which are determined by means of sensors.

11. A computer program (32), characterized in that said computer program is programmed for use in a method according to claim 1.

12. A storage medium (30) for an open-loop and/or closed-loop control device (24) of an internal combustion engine, characterized in that a computer program (32) for use in a method according to claim 1 is stored on said storage medium (30).

13. An open-loop and/or closed-loop control device (24), characterized in that said open-loop and/or closed-loop control device (24) is programmed for use in a method according to claim 1.

14. The method according to claim 1, characterized in that the state variables (46) are one of physical variables, numerical variables and variables which are determined by means of sensors.

15. The method according to claim 14, characterized in that the manipulated variables (44) are one of physical variables, numerical variables and variables which are determined by means of sensors.

16. A method for diagnosing or adapting at least one system (12, 14) of a motor vehicle (10), said method comprising:
(a) changing at least one manipulated variable (44) of a first system of the at least one system (12, 14) of the device (10) with respect to a currently present value of the manipulated variable (44);
(b) determining at least two state variables (46) of a second system of the at least one system (12, 14) of the device (10); and
(c) making a decision (61) about the further execution of the method as a function of the at least two state variables (46),
characterized in that the systems (12, 14) include an air system, an injection system, an torque system and an exhaust system of the motor vehicle,
characterized in that the state variables (46) comprise at least one of the following variables:
a sensor variable or a variable derived therefrom;
an actuator variable or a variable derived therefrom;
an offset value;
a gain factor;
a catalytic converter temperature; and
an oxygen filling level of a catalytic converter, and
characterized in that the manipulated variables (44) comprise at least one of the following variables of an exhaust system:
a lambda value of the exhaust gas;
an oxygen mass flow rate;
an exhaust gas mass flow rate;
a variable of an exhaust gas recirculation system;
an ignition angle;
a proportion of oxygen, nitrogen, hydrogen, carbon monoxide and/or hydrocarbons in the exhaust gas;
a metering rate of additives in the exhaust gas; and
an exhaust gas temperature.

17. A method for diagnosing or adapting at least one system (12, 14) of a motor vehicle (10), said method comprising:
(a) changing at least one manipulated variable (44) of a first system of the at least one system (12, 14) of the device (10) with respect to a currently present value of the manipulated variable (44);
(b) determining at least two state variables (46) of a second system of the at least one system (12, 14) of the device (10); and
(c) making a decision (61) about the further execution of the method as a function of the at least two state variables (46),
characterized in that the systems (12, 14) include an air system, an injection system, an torque system and an exhaust system of the motor vehicle, and
characterized in that in step (c) the further execution of the method comprises at least one of the following measures:
refined and/or repeated diagnosis of one of the systems (12, 14) or of a system component (47) which is contained therein and which is supposed to be faulty;
changing of a diagnostic algorithm (65) as a function of the at least two state variables (46) which are determined;
selection of alternative diagnostic algorithms (65) from a stored supply (64) as a function of the at least two state variables (46) which are determined;
changing of the sequence of individual diagnostic steps of a diagnostic algorithm (65); and
changing of the sequence in which the systems (12, 14) and/or system components (47) are checked.

18. A method for diagnosing and/or adapting at least one system (12, 14) of a device (10), characterized in that said method comprises:
(a) changing at least one manipulated variable (44) of a first system of the at least one system (12, 14) of the device (10) with respect to a currently present value of the manipulated variable (44);
(b) determining at least two state variables (46) of a second system of the at least one system (12, 14) of the device (10); and
(c) making a decision (61) about the further execution of the method as a function of the at least two state variables (46);
characterized in that the manipulated variables (44) comprise at least one of the following variables of an exhaust system:
a lambda value of the exhaust gas;
an oxygen mass flow rate;
an exhaust gas mass flow rate;
a variable of an exhaust gas recirculation system;
an ignition angle;
a proportion of oxygen, nitrogen, hydrogen, carbon monoxide and/or hydrocarbons in the exhaust gas;
a metering rate of additives in the exhaust gas; and
an exhaust gas temperature.

19. The method according to claim 18, characterized in that the device (10) is a motor vehicle.

20. The method according to claim 18, characterized in that the systems (12, 14) which are to be tested or adapted comprise at least one of an air system, an injection system, a torque system and an exhaust system of the motor vehicle.

21. The method according to claim 18, characterized in that one of an absolute value, a relative value and a gradient of the manipulated variables (44) is changed.

22. The method according to claim 18, characterized in that one of an absolute value, a relative value and/or a gradient of the state variables (46) is evaluated.

23. The method according to claim 18, characterized in that the manipulated variables (44) are one of physical variables, numerical variables and/or variables which are determined by means of sensors.

24. A computer program (32), characterized in that said computer program is programmed for use in a method according to claim 18.

25. A storage medium (30) for an open-loop and/or closed-loop control device (24) of an internal combustion engine, characterized in that a computer program (32) for use in a method according to claim 18 is stored on said storage medium (30).

26. An open-loop and/or closed-loop control device (24), characterized in that said open-loop and/or closed-loop control device (24) is programmed for use in a method according to claim 18.

27. The method according to claim 18, characterized in that the state variables (46) are one of physical variables, numerical variables and variables which are determined by means of sensors.

28. The method according to claim 27, characterized in that the manipulated variables (44) are one of physical variables, numerical variables and variables which are determined by means of sensors.

29. A storage medium (30) for an open-loop and/or closed-loop control device (24) of an internal combustion engine, characterized in that a computer program (32) for use in a method for diagnosing and/or adapting at least one system (12, 14) of a device (10) is stored on said storage medium (30), the method comprising:

(a) changing at least one manipulated variable (44) of a first system of the at least one system (12, 14) of the device (10) with respect to a currently present value of the manipulated variable (44);
(b) determining at least two state variables (46) of a second system of the at least one system (12, 14) of the device (10); and
(c) making a decision (61) about the further execution of the method as a function of the at least two state variables (46).

\* \* \* \* \*